(No Model.) 2 Sheets—Sheet 1.

M. D. KNOWLTON.
FRICTION MOVEMENT.

No. 564,250. Patented July 21, 1896.

Witnesses:—
D. H. Hayford
A. L. Hayes

Inventor:—
Mark D. Knowlton
By Chas. F. Dam
atty.

(No Model.) 2 Sheets—Sheet 2.
M. D. KNOWLTON.
FRICTION MOVEMENT.

No. 564,250. Patented July 21, 1896.

WITNESSES:
Fred. W. Dane
A. L. Hayes.

INVENTOR
Mark D. Knowlton
BY
Chas. F. Dane
ATTORNEY.

UNITED STATES PATENT OFFICE.

MARK D. KNOWLTON, OF ROCHESTER, NEW YORK.

FRICTION-MOVEMENT.

SPECIFICATION forming part of Letters Patent No. 564,250, dated July 21, 1896.

Application filed December 6, 1894. Serial No. 530,973. (No model.)

*To all whom it may concern:*

Be it known that I, MARK D. KNOWLTON, of Rochester, Monroe county, State of New York, have invented new and useful Improvements in Friction-Movements, of which the following description, taken in connection with the drawings herewith accompanying, is a specification.

My invention has for its object to provide an improved means for securing an operative or inoperative connection, as may be desired, between two parts, one of which is adapted to receive motion from the other, and which said parts may form a part of, or have connection with, the actuating part or mechanism and the part or mechanism to be operated thereby, respectively, of a machine or other device; and the invention consists in the construction and combination of the several parts for securing such connection between the parts and in the means for controlling and regulating the movements of the same, as will hereinafter be set forth in detail, and pointed out in the claims.

Figure 1:
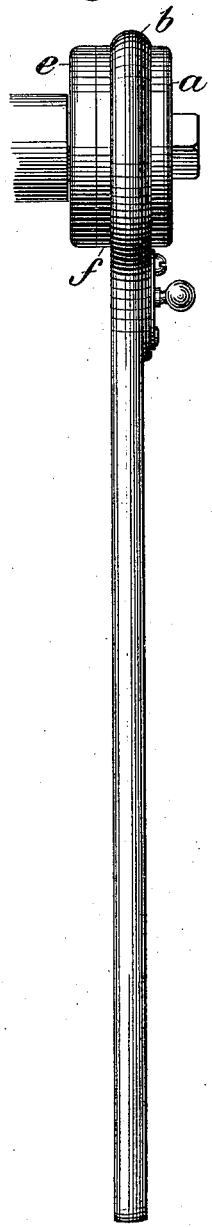
Figure 2:
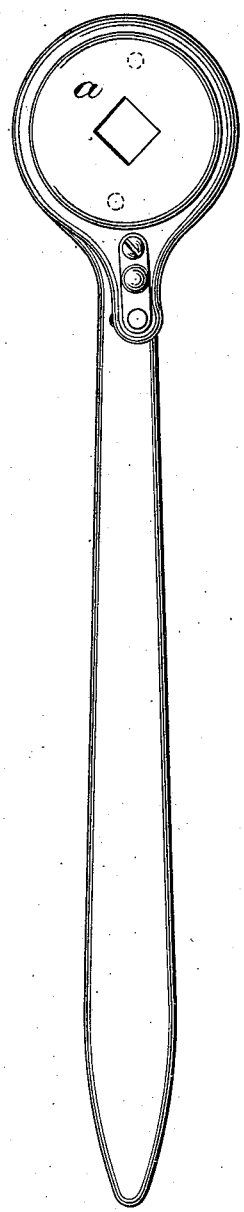
Figure 4:
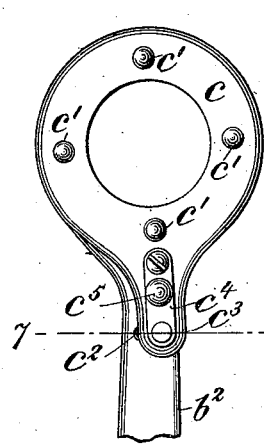
Figure 3:
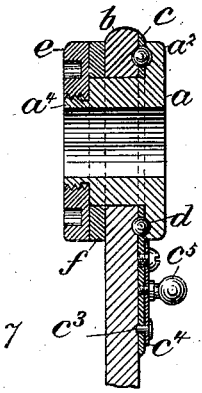
Figure 5:
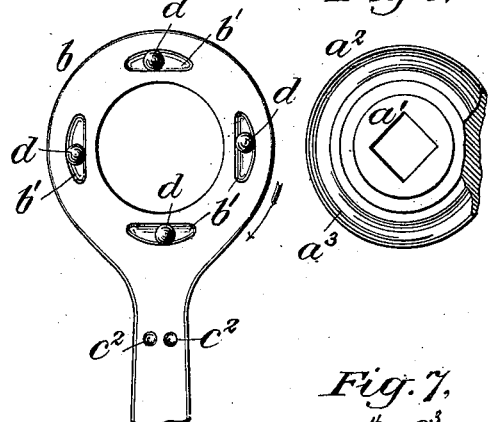
Figure 6:
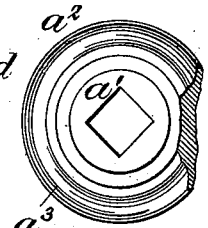
Figure 7:
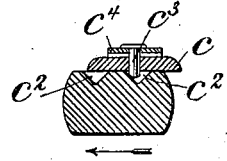
Figure 8:
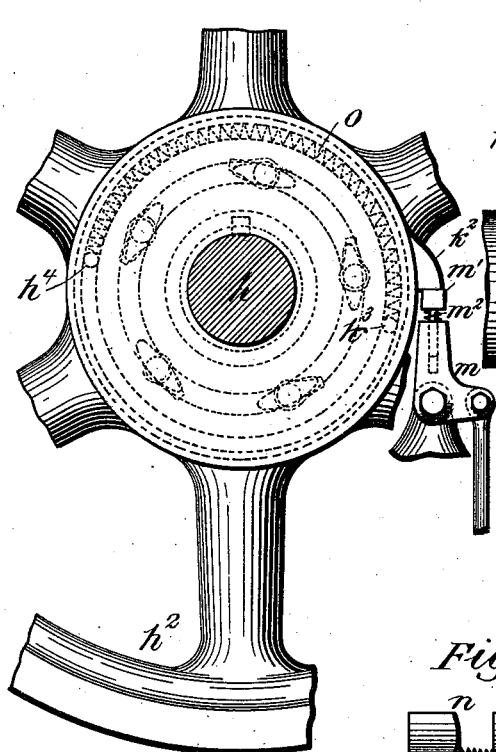
Figure 9:
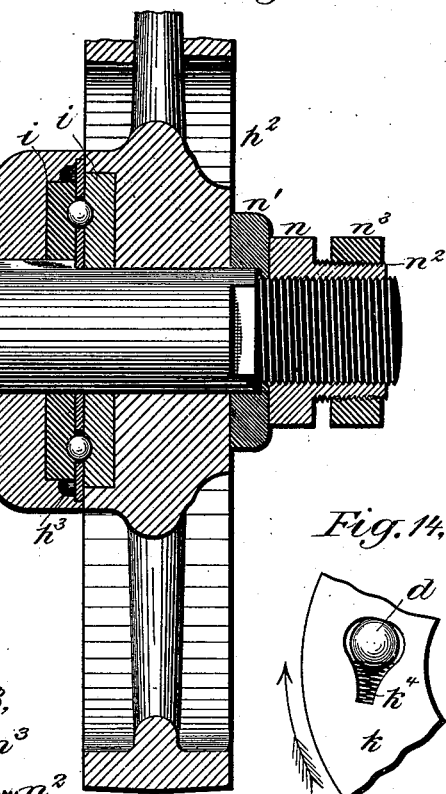
Figure 14:
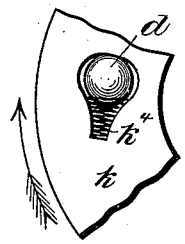
Figure 13:
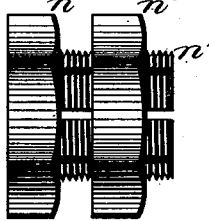
Figure 10:
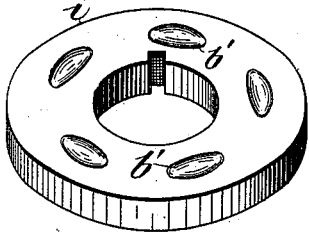
Figure 11:
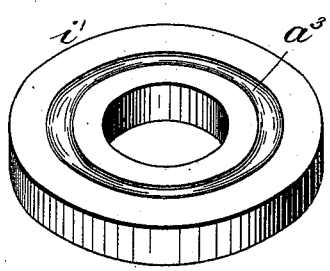
Figure 12:
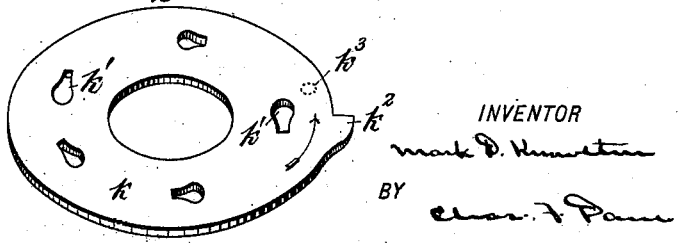

Referring to the accompanying drawings, in which I have illustrated my invention as embodied in a drill-ratchet and also applied as a clutch to the driving wheel and shaft of a machine, Figure 1 represents an edge or side view of a drill-ratchet embodying my invention with a section or part of a drill in connection therewith; Fig. 2, a face view of the same; Fig. 3, a central vertical section with the handle broken away; Fig. 4, a face view with the flanged head removed; Fig. 5, the recessed face of the movable operating-ring; Fig. 6, a rear view of the head, showing its grooved flange; Fig. 7, an enlarged sectional view through line 7 7 of Fig. 4. Fig. 8, Sheet 2, is an end view of a section of a driving shaft and pulley, showing my invention applied thereto and also showing a trip device in operative position. Fig. 9 is a sectional view through the center of the construction shown in Fig. 8; and Figs. 10, 11, 12, 13, and 14 are detail views of parts removed from their connection with the shaft and pulley, to be hereinafter referred to.

To explain in detail, $a$ represents a cylindrical head, which, in the present instance shown, is provided with a squared opening $a'$ for connection with a drill, as shown in Fig. 1, or other object, although such opening may be of any desired form according to the object for which it may be adapted for connection, said head being the part to which movement is adapted to be given.

The head $a$ is provided with a flange $a^2$ projecting its periphery, having a continuous circular groove or depression $a^3$ on its inner face. $b$ is a ring loosely mounted on said cylindrical head to move or rotate thereon and is provided with a series of depressions $b'$ in that face opposite or adjacent to the inner face of the flange $a^2$ and in a line with or immediately opposite the groove in the latter, which said depressions $b'$ are formed with their greatest depth at the center and gradually taper toward each end to the surface of the ring, as clearly shown in Fig. 5. A second ring $c$ is also loosely mounted on the head $a$ at a point between the flange $a^2$ and the ring $b$, and, in the present instance shown, has connection with the latter to be moved or operated in combination therewith, as will be hereinafter described. This ring $c$ is provided with circular openings $c'$ therein arranged to coincide with the depressions $b'$ in the ring $b$ and form, in combination with the opposing surfaces of the depressions $b'$ and groove $a^3$, a circular or rounded opening in which are located spherical bodies or balls $d$, as clearly shown in Fig. 3, which are of such size or circumference as to be loose within their opening or seat when at the center or deeper portion of the same, but, when moved toward the shallower portion of the depression at either side of its center, will be firmly bound between the opposing surfaces of the flange $a^2$ and ring $b$ and lock the same to cause both to move together.

The ring $b$ is firmly held from lateral or endwise movement on the head $a$ by means of a nut $e$, which is located on a threaded end $a^4$ on the head $a$, in contact with an interposed ring or washer $f$.

The plate or ring $c$ is adapted to be held in a position with the openings $c'$ therein slightly at one side of the center or deeper portion of the depressions $b'$ in the ring $b$ by means of a pin $c^3$, projecting from its under surface and extending into one of two recesses $c^2 c^2$, located in the part $b$, which said recesses are located in a position to hold the ring $c$ with the openings therein in an operative position at either side of the center of the depressions $b'$. The pin $c^3$ is carried by a spring $c^4$, which is secured at one end on the outer face of the ring $c$ or part thereof, as more clearly shown in Fig. 4. The depressions $c^2$ in the part $b$ are formed with tapering walls, as more clearly shown in Fig. 7, against the inner one of which the pin $c^3$ is held with a yielding pressure by the spring $c^4$ and caused thereby to have a movement toward the center or deeper portion of said recess $c^2$, which action of the pin $c^3$ tends to produce a continuous yielding movement of the ring $c$ in a direction to carry or hold the balls $d$ in a position toward the shallower portion of the depressions $b'$ and in locking contact with the opposing parts.

The operation of the parts or devices constructed as above set forth is as follows: The head $a$ being placed in connection with a drill or other object to be operated, the ring $b$ is moved or operated by its arm or extension $b^2$ (which latter forms the operating-handle of the device) in a direction, as shown by the arrow in Fig. 7, opposite that given to the ring or plate $c$, by the action of the pin $c^3$, and act, in combination with said ring, to cause the balls to be firmly bound between the opposing surfaces and lock the same, whereby the head $a$ and connecting-drill may be turned or operated. The balls are freed from such locking contact between the parts by a backward or return movement of the part $b$, in which direction there is no opposing action by the ring $c$, and carried backward loosely in the groove $a^3$ to a position for locking the parts at the next forward turn of the plate or ring $b$. It will of course be understood that the balls $d$ are thus brought into or from locking engagement with the opposing parts at the forward and return movement of the part $b$, acting in combination with the ring $c$ as described, by reason of the head $a$ being held stationary, or nearly so, by the connecting-drill or other object until such engagement or disengagement is made. A reverse movement may be given to the head $a$ by shifting the pin $c^3$ to the opposite depression $c^2$, thereby moving the ring $c$ to bring the openings $c'$ therein, and consequently the balls $d$, to a position at the opposite side of the depressions $b'$ in the ring $b$, in which portion of the depression the balls $d$ may be operated in a manner as hereinbefore described.

$c^5$ is an adjusting-screw which engages with the spring $c^4$ and is adapted for regulating the pressure of the latter upon the pin $c^3$.

By the employment of the spherical bodies or balls $d$ as a friction-lock between the two parts to be connected, in lieu of parts having straight or flat engaging surfaces, and forming the opposite bearing-surfaces with a rounded or counterpart surface to conform to the engaging portion of the balls $d$, as described, I secure an increased or maximum amount of contact or friction surface and of such form as to most firmly bind or lock the parts, and also allow for instantaneous, or nearly so, connection or release of said parts, which construction I claim as one of the main features of my invention. Such construction may be modified more or less, however, as will hereinafter be described, and still be within the scope of my invention.

Referring to Figs. 8, 9, 10, 11, 12, 13, and 14, Sheet 2, in which I have illustrated my invention applied as a clutch to the pulley and shaft of a machine, as before referred to, $h$ represents a rotating shaft having a collar $h'$ keyed thereon, and $h^2$ a pulley loosely mounted on said shaft.

Disks or plates $i$ and $i'$, (shown in detail in Figs. 10 and 11,) provided with the tapered depressions $b'$ and continuous groove $a^3$, before described, respectively, are rigidly seated in the collar $h'$ and the pulley $h^2$ in their proper relative position to each other, as shown in Fig. 9. A ring $k$, having openings $k'$ therein to receive the balls $d$ and corresponding in function to the ring $c$, before described, is loosely mounted on the shaft $h$, between the parts $i$ and $i'$, and is adapted to be held in a normal position to hold the balls $d$ in a position toward one end of the depression $b'$ and in locking contact with the opposing parts, whereby the shaft is caused to rotate with the pulley by means of a spring $o$, which is located or seated within a recess $h^3$ in the collar $h'$, with one end bearing against the end wall $h^4$ of said recess and its opposite end against a stud or pin $k^3$ on the ring $k$, which projects into said recess, as more clearly shown in Fig. 8.

In order to move the balls $d$ from locking engagement between the parts and allow the pulley to revolve loosely on the shaft, I have provided the ring or trip-plate $k$ with a lip or projection $k^2$ in its periphery, which is adapted to be engaged by a suitable stop device $m$ when the latter is moved into position for such engagement, and stopped from rotation thereby to move the balls from locking engagement toward the center or deeper portion of the depressions $b'$. Immediately upon such release of the balls from locking engagement the shaft is stopped from movement.

$k^4$ represents springs which are located in the openings in the plate $k$ at the rear of each ball, and adapted to act upon the latter to hold them with a yielding pressure against the forward edge of the openings $k'$, in order that all the balls may take hold or be moved into locking engagement with the opposing parts simultaneously, and thus overcome any imperfect work in the grooves or depressions in which they move, which might tend to prevent their acting in unison, as will be readily understood.

The trip-lever or stop $m$, in the present instance shown, consists of a pivoted lever, which, according to my invention, is provided with a yieldingly-projecting part $m'$, which is adapted to engage with the projection on the trip-plate and be moved thereby until it comes in contact with its supporting part or lever and forms a solid stop, which stop frees the balls, as before described. When the balls are thus freed, the part $m'$ has a slight upward movement by reason of the reaction of the interposed spring $m^2$ and causes a corresponding backward movement of the trip-plate, which movement is adapted to carry the balls back far enough into the deeper portion of the depression to insure perfect freedom of the same, and thus prevent any liability of their chafing with the rotating pulley, and produce the resulting inclination to lock and heat the parts, as would be caused if the balls were located too near the pulley or the disk $i'$, forming part of the same, as will be understood.

The pulley $h^2$, in the present instance shown, is held from endwise movement on the shaft $h$ and in its proper relation to the plate or part $i$ by means of a nut $n$, which is screwed upon a threaded end of the shaft $h$ and in contact with a washer $n'$, which is interposed between said nut and the pulley. This nut is provided with a longitudinally-tapered threaded part $n^2$, formed in sections, upon which a check-nut $n^3$ is screwed and locks the same in close contact with the shaft, thus preventing any liability of endwise movement of the pulley on the latter.

It will be understood that the point of locking contact of the balls $d$ in the depressions $b'$ will always be in substantially the same place, and in case some of the depressions at such point should become unduly enlarged or indented by the continuous contact of the ball, by reason of some flaw or imperfection in the metal, and thereby prevent the ball or balls at such points from readily taking hold of the opposing parts, I overcome such defect by adjusting the position of the pulley on its shaft to allow a greater space between the parts and consequently allow the balls to move farther toward the end of the depressions and find a new locking-point therein. This adjustment of the parts for the purpose set forth I also claim as one of the essential features of my invention.

Having thus illustrated and set forth my invention as embodied in two practical forms, it will be obvious that various modifications in the construction and arrangement of the several parts may be made without departing from the spirit of my invention. For instance, the continuous groove $a^3$ may be dispensed with and the balls be operated in contact with a flat surface, or, again, the tapered depressions $b'$ might be formed with a flat tapered or inclined surface in lieu of being formed in cross-section to conform to the surface of the balls, as shown and described.

Having thus set forth my invention, what I claim as new, and desire to secure by Letters Patent of the United States, is—

1. The combination of two oppositely-located movable parts, supported in a manner whereby the space between their adjacent faces may be varied, one part being provided with a tapered or inclined surface extending in the direction of its line of movement, a roller located between said parts in a position to operate on said tapered or inclined surface, and means located between said movable parts for engaging with said roller to control the movement of the same, substantially as described and for the purpose set forth.

2. The combination of two oppositely-located movable parts, supported in a manner whereby the space between their adjacent faces may be varied, one part being provided with a tapered or inclined surface extending in the direction of its line of movement, a roller located between said parts in a position to operate on said tapered or inclined surface, and a movable plate interposed between said parts, provided with an opening to receive the said roller, substantially as described and for the purpose set forth.

3. The combination of two oppositely-located movable parts, supported in a manner whereby the space between their adjacent faces may be varied, one part being provided with a tapered or inclined surface, a roller located between said parts in a position to operate on said tapered or inclined surface, a movable plate interposed between said parts provided with an opening to receive the said roller, and means for acting upon said plate to movably hold the roller in a normal position in locking engagement with the opposing parts, substantially as described and for the purpose set forth.

4. The combination of two rotating parts, one part being provided with a tapered or inclined surface, a roller located between said parts in a position to operate on said inclined surface, a movable plate interposed between said parts, provided with an opening therein to receive said roller, a spring for acting upon said roller in its opening in said plate and means for controlling the movement of the latter, substantially as described and for the purpose set forth.

5. The combination with two rotating parts, one part being provided with a tapered or inclined surface, a roller located between said parts in a position to operate on said inclined surface, and a movable plate interposed between said parts to operate therewith, provided with an opening therein to receive said roller and movably hold the same in locking engagement with the opposing parts, of a device constructed for engaging with said movable plate to stop the same in its rotation and give it a return movement, substantially as described and for the purpose set forth.

6. The combination of two oppositely-located movable parts, supported in a manner whereby the space between their adjacent faces may be varied, one part being provided with a groove and the other with a longitudinally-tapered recess or depression, in their adjacent faces, a spherical roller supported between said parts and in the groove or depression in the same respectively; said groove and depression being formed in cross-section to conform to the surface of the engaging roller, and means located between said movable parts for engaging with said roller to control the movement of the same, substantially as described and for the purpose set forth.

7. The combination of two oppositely-located movable parts, supported in a manner whereby the space between their adjacent faces may be varied, one part being provided with a recess or depression tapered from its center or point of greatest depth toward its opposite ends, a roller supported between said parts in a position to operate in said recess or depression, and means located between said movable parts for engaging with said roller to control the movement of the same, substantially as described and for the purpose set forth.

8. The combination of two oppositely-located movable parts, one part being provided with a groove and the other with a depression tapered from its center or point of greatest depth toward its opposite ends, a roller supported between said parts and in the groove and depression therein respectively, a movable plate or ring located between said parts provided with an opening therein adapted to receive said roller, and means for connecting said ring with that part having the depression therein in a movable position with relation thereto, substantially as described and for the purpose set forth.

MARK D. KNOWLTON.

Witnesses:
CHAS. F. DANE,
A. L. HAYES.